Patented Sept. 15, 1931

1,823,127

UNITED STATES PATENT OFFICE

OTTO SCHMIDT, KARL SEYDEL, AND NIKOLAUS ROH, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF ARTIFICIAL RESINS

No Drawing. Application filed October 11, 1926, Serial No. 141,026, and in Germany October 21, 1925.

It has been suggested elsewhere to produce artificial resins by treating a mono-cyclic hydroaromatic ketone with condensing agents, which may have alkaline, neutral or acid reaction.

We have now found that artificial resins of the kind above referred to can be produced with great advantage by starting from mixtures of several cyclic ketones or of one or several cyclic ketones with aromatic or hydroaromatic hydroxyl compounds such as alcohols or phenols and subjecting them to alkaline, neutral or acid condensation. For example, mixtures of cyclohexanone with meta- or para-methyl-cyclohexanone or both, or mixtures of several methyl-cyclohexanones, which are readily obtainable by the hydrogenation of purified industrial cresylic acid, subsequent dehydrogenation and fractional distillation, may be employed with great advantage. Also mixtures containing considerable quantities of cyclic hydroxyl compounds are very suitable. For example the crude dehydrogenation product obtained by passing vapors of methyl-cyclohexanol over copper, may be employed directly.

The condensation agents to be employed in the process according to the present invention may be of any desired kind; they may have alkaline, neutral or acid reaction. It is often advantageous to carry out the condensation under elevated pressure, but the process may be carried out as well under ordinary pressure.

The present process has the great advantage that the reaction proceeds very rapidly and readily under comparatively mild conditions. The artificial resins obtained thereby are of great industrial importance, as they are very stable against light, alkalies and acids, colorless and readily soluble in the solvents usually employed for the manufacture of lacquers and especially also in linseed oil.

Very valuable results are obtained when the artificial resins obtained according to the present invention are employed in conjunction with other natural or artificial resins or cellulose esters or ethers or natural or artificial caoutchouc or several such materials which are hereinafter referred to for the sake of brevity as other plastic substances. Thereby lacquers, cements, lutes, films, artificial masses for insulating and other coatings and the like of very good properties are obtained; the said products are very elastic and stable against atmospheric and chemical influences and light. Such products may also contain filling masses such as saw dust, diatomaceous earth, asbestos and the like.

The following examples will further illustrate how our present invention may be carried out in practice, but the invention is not limited to these examples. The parts are by weight.

Example 1

100 parts of cyclohexanone are mixed with 200 parts of methyl-cyclohexanone and boiled for from 14 to 20 hours under ordinary pressure under a reflux-cooler, after a concentrated solution of 100 parts of caustic potash in methyl alcohol has been added. The bulk of the methanol is then distilled off at about 120° C. and the rest thereof is removed by introducing steam into the mixture. The alkali lye is removed and the resin poured into water. After being cooled, it is powdered and washed with water containing some hydrochloric acid until all alkali is removed. It is then molten in vacuo in a vessel heated by a heating bath of a temperature of about 160° C., and maintained at the said temperature, until practically no oily liquid distils over. The resin is then allowed to cool, for example after being poured on a sheet-metal. The resin so obtained is readily soluble for example in linseed-oil, cyclohexanone, benzene or mixtures of ethyl alcohol with other solvents.

Example 2

100 parts of a crude mixture of methyl-cyclohexanones containing about 66 per cent of isomeric methyl-cyclohexanones and 34 per cent of methyl-cyclohexanols are heated with 50 parts of a mixture containing about 66 per cent of cyclohexanone and about 34 per cent of cyclohexanol and with a concentrated solution of 67 parts of caustic potash in methanol and worked up in the manner described in Example 1. In the distillation with steam, the mixture of cyclohexanols is obtained practically free from ketones, so that it can be separated in a very simple manner. A clear, colorless resin of properties similar to those described in Example 1 is obtained as residue. The ketone mixtures may contain, besides the cyclic alcohols, other bodies such as phenols. The reaction may also be carried out with the addition of other solvents or diluents and with acid or neutral condensing agents. Also higher cyclic ketones, whether derived from hydrogenated benzene hydrocarbons or from hydrogenated naphthalene and its homologues may be employed.

Example 3

A slow current of gaseous hydrochloric acid is introduced at room temperature for 24 hours into a mixture of 1 part of crude industrial cyclohexanone consisting of about 70 per cent of cyclohexanone, 29 per cent of cyclohexanol and 1 per cent of phenol, with 2.5 parts of crude industrial methyl-cyclohexanone consisting of about 66 per cent of methyl-cyclohexanone, 33 per cent of methyl-cyclohexanol and 1 per cent of cresol. The reaction product is subjected to distillation in vacuo until the distillate has a boiling point of about 200° C. under a pressure of 15 to 20 millimetres of mercury. A soft resin is obtained as residue, which may be employed for most various purposes. The reaction may also be carried out in the presence of an inert solvent such for example as benzene.

Example 4

A current of dry, gaseous hydrochloric acid is passed for 24 hours into a mixture of 2 parts of crude cresylic acid and 1 part of cyclohexanone or methyl-cyclohexanone, or of 4 parts of crude cresylic acid and 1 part of each, cyclohexanone and methyl-cyclohexanone, while cooling the mixture with ice. The reaction product is distilled in vacuo, whereby unaltered initial material and hydrochloric acid are removed first. The distillation is continued until the distillate boils at about 200° C. under a pressure of 15 to 20 millimetres of mercury. A light yellow resin soluble in the usual organic solvents and in caustic alkali lyes is obtained. The yield is increased by adding dehydrating agents such as zinc chlorid, ferric chlorid and the like. It may be advantageous to carry out the reaction in the presence of inert diluents.

Example 5

100 parts of cellulose nitrate, 50 parts of caoutchouc and 70 parts of an artificial resin obtained according to Example 1 are kneaded in a kneading mill with 200 parts of a mixture of ethyl alcohol and benzene.

After a short time a homogeneous mass is obtained which by slightly heating is freed from the excess of the solvent. A tough, plastic mass is obtained which is readily soluble in butyl acetate and in many other organic solvents. These solutions are very suitable for use as lacquers and form adherent, tough coatings of good fastness.

Example 6

Copal resin is dissolved in the usual manner in linseed oil and mixed with a solution of an artificial resin obtained according to example 2 in linseed oil. The resulting solution is mixed with additions as are usual in the manufacture of varnishes, such as for example turpentine oil or substitutes therefor, siccatives and the like. The varnish so obtained forms coatings of good fastness.

A similar varnish is obtained by melting the copal resin with the artificial resins and dissolving the resulting product together with the abovementioned additions in linseed oil.

What we claim is:

1. The process for producing artificial resins which comprises condensing a mixture of a cyclic ketone with at least one body selected from the group consisting of cyclic ketones other than the aforementioned ketone and cyclic alcohols, by means of a condensing agent.

2. The process of producing artificial resins which comprises condensing a mixture of a cyclic ketone with another cyclic ketone and a cyclic alcohol by means of a condensing agent.

3. As new articles of manufacture light colored artificial resins which are stable against light, acids and alkalies and soluble in most organic solvents, comprising condensation products of a cyclic ketone with at least one body selected from the group consisting of cyclic ketones other than the aforementioned ketone and cyclic alcohols.

4. As new articles of manufacture light colored artificial resins which are stable against light, acids and alkalies and soluble in most organic solvents, comprising condensation products of cyclohexanone with a homologue thereof.

5. As new articles of manufacture light colored artificial resins which are stable against light, acids and alkalies and soluble in most organic solvents, comprising condensation products of cyclohexanone with a homologue thereof and with at least one body selected from the group consisting of cyclohexanol and its homologues.

In testimony whereof we have hereunto set our hands.

OTTO SCHMIDT.
KARL SEYDEL.
NIKOLAUS ROH.